United States Patent
Rouault

(10) Patent No.: US 7,308,502 B2
(45) Date of Patent: Dec. 11, 2007

(54) METHOD AND ARCHITECTURE TO PROVIDE CLIENT SESSION FAILOVER

(75) Inventor: Jason Rouault, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 804 days.

(21) Appl. No.: 10/326,774

(22) Filed: Dec. 20, 2002

(65) Prior Publication Data

US 2004/0122961 A1 Jun. 24, 2004

(51) Int. Cl.
*G06F 15/16* (2006.01)

(52) U.S. Cl. .......................... 709/229; 709/227; 726/4

(58) Field of Classification Search .................. None
See application file for complete search history.

(56) References Cited

U.S. PATENT DOCUMENTS

| | | | |
|---|---|---|---|
| 5,796,934 A * | 8/1998 | Bhanot et al. ................. | 714/4 |
| 6,018,805 A * | 1/2000 | Ma et al. ...................... | 714/4 |
| 6,199,110 B1 | 3/2001 | Rizvi et al. | |
| 6,490,610 B1 * | 12/2002 | Rizvi et al. ................. | 718/101 |
| 6,918,044 B1 * | 7/2005 | Robins et al. ................ | 726/5 |
| 2002/0078182 A1 | 6/2002 | Barillaud et al. | |
| 2002/0087912 A1 | 7/2002 | Kashyap | |
| 2003/0191964 A1 * | 10/2003 | Satyavolu et al. .......... | 713/201 |
| 2003/0200465 A1 * | 10/2003 | Bhat et al. ................... | 713/202 |
| 2004/0066274 A1 * | 4/2004 | Bailey ......................... | 340/5.3 |

FOREIGN PATENT DOCUMENTS

WO    WO 00/79391    12/2000

OTHER PUBLICATIONS

Invitation to Respond to Written Opinion dated Aug. 30, 2005, Singapore Patent App. No. 200304271-0, Intellectual Property Office of Singapore.
Australian Patent Office Written Opinion dated Aug. 5, 2005, Singapore Patent App. No. SG200304271-0. Total pp. 4.
Australian Patent Office Search Report dated Aug. 5, 2005, Singapore Patent App. No. SG200304271-0. Total pp. 3.
Hallam-Baker P: "Security Assertions Markup Language. Core Assertion Architecture—Examples & Explanations" Internet draft, May 14, 2001.

* cited by examiner

*Primary Examiner*—Kenny Lin

(57) ABSTRACT

In an embodiment, a method to provide client session failover, includes using a security assertion to re-establish a session with a client to permit the client to failover to a failover server. In another embodiment, an apparatus to provide client session failover, includes: a client; a first server configured to provide a security assertion to the client; and a failover server configured to re-establish a session with a client based upon the security assertion.

32 Claims, 2 Drawing Sheets

METHOD AND ARCHITECTURE TO PROVIDE CLIENT SESSION FAILOVER

TECHNICAL FIELD

Embodiments of the present invention relate generally to client-server computing technology. Embodiments of the present invention relate more particularly to a method and architecture to provide client session failover.

BACKGROUND

In client-server computing environments, preserving the authenticated client session state in the event of a server failure is an important task. This is especially the case when the client is an application that is acting as an interface for a human user. If the server were to fail during the user's active session, the session would be lost and this would require the user to re-authenticate to a standby server, or another server in the processor farm. This creates a bad user experience, and worse, the potential loss of user session data.

Client session failover is complex to implement, and sometimes the solutions that are designed to provide this fault-tolerant behavior are themselves subject to failure because of their reliance on non fault-tolerant mechanisms. Additionally, session preserving solutions can be overly burdensome on the client, the server, or both devices because of requirements for additional network communications, processing, and storage.

Typically, the current approach taken is for the server to have a dedicated process that is responsible for session management. This session manager process is made redundant and distributed across the network. The context state of each user is persisted in the session manager and is then replicated either in real-time or at intervals to the other session managers. Should a particular session manager server fail, then the other servers will have the user's session state. The problem with this current solution is that it requires an excessive amount of networking calls to replicate each user's session across the redundant session managers, and results in consumption of limited bandwidth. Additionally, this type of solution does not scale well either horizontally across networking nodes, or vertically across geographies.

Another current solution that is often employed for this problem is the use of clustering. Clustering concerns the grouping of several servers that all have the same operating system, relational databases, and applications. This grouping of servers is considered logically as one. The software that manages the cluster is responsible for distributing client requests and keeping the systems synchronized. In the event that a server fails, the other servers in the cluster have the client state information, applications, and relational databases, so that processing can continue as if there was no failure. Although this type of solution is suitable for its intended purpose, this solution is expensive to deploy because of the duplicate hardware and software resources that are required.

Other current session preserving solutions rely on storing the session information on the client and having this information conveyed to the server applications during the normal client/server communications. Since in this scenario, the server is stateless, server failover causing the loss of session information is not an issue. However, this approach does have its disadvantages, since the client now must possess the logic for managing the session information. When the session state is stored on the client, the session state must be transmitted to the server for each request. Often, the server response includes yet another copy of the session state, changed or otherwise. This greatly increases the communication overhead. Additionally, storing all session information on the client requires more complex client processing to address confidentiality and integrity of the session information to insure a secure system.

Thus, the current approaches and/or technologies are limited to particular capabilities and/or suffer from various constraints.

SUMMARY OF EMBODIMENTS OF THE INVENTION

At least some of the various embodiments are now described. In one embodiment of the invention, a method to provide client session failover, includes using a security assertion to re-establish a session with a client to permit the client to failover to a failover server. The method also includes establishing a trust relationship between a first server that issues the security assertion and the failover server.

In another embodiment of the invention, an apparatus to provide client session failover, includes: a client; a first server configured to provide a security assertion to the client; and a failover server configured to re-establish a session with a client based upon the security assertion.

Other embodiments of the invention include, but are not limited to, the various embodiments described below.

These and other features of an embodiment of the present invention will be readily apparent to persons of ordinary skill in the art upon reading the entirety of this disclosure, which includes the accompanying drawings and claims.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
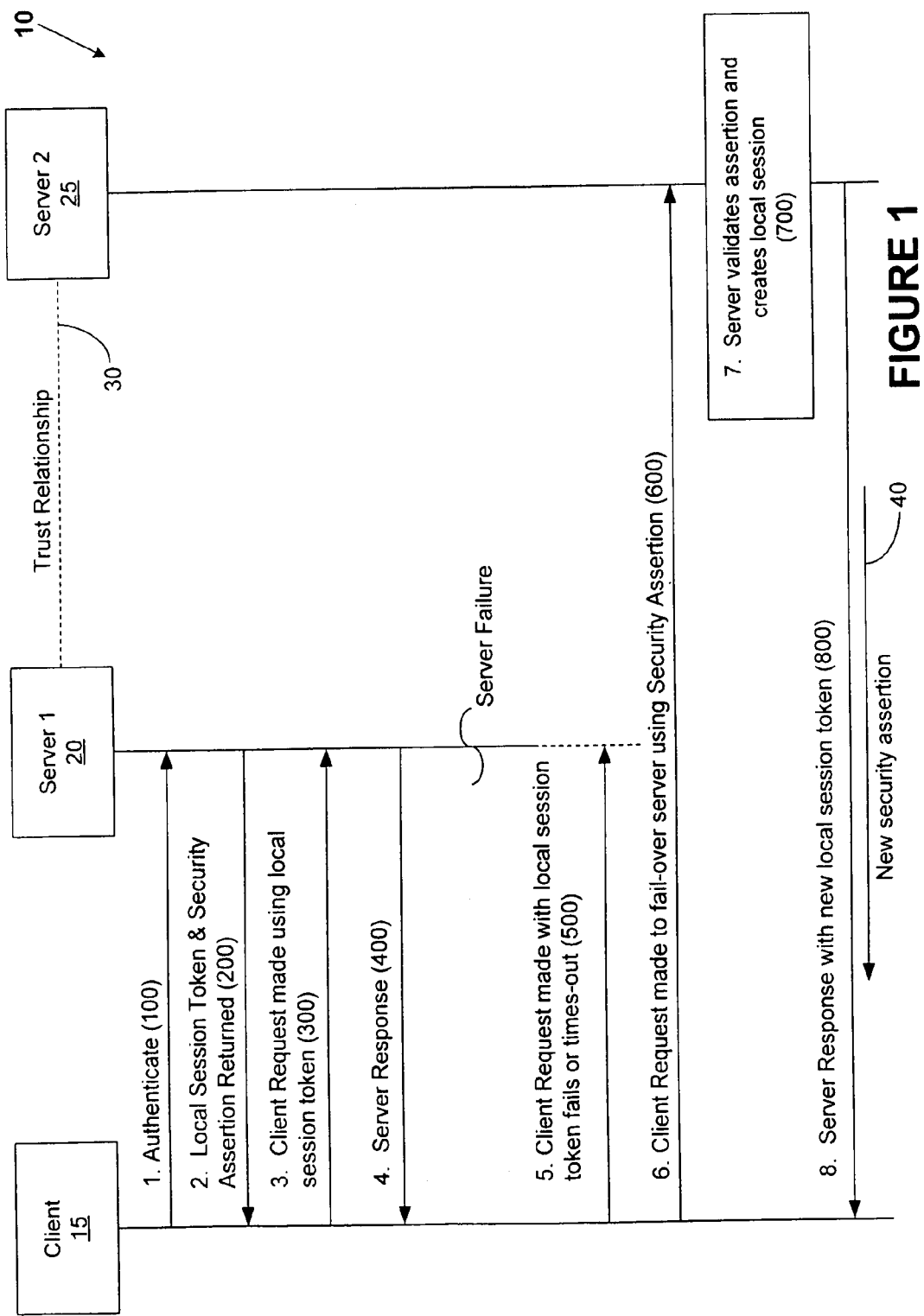
FIG. 1 is a block diagram illustrating the interactions that would take place before and after a server failover and how a client session is preserved before and after the server failover.

FIG. 1 is a block diagram illustrating the interactions that would take place before and after a server failover and how a client session is preserved before and after the server failover. In an embodiment, the system 10 uses the trusted security assertions that are stored on a client 15 to re-establish a session with a server(s) in the event of a fail-over. For example, if the client 15 has established a session with a server 20 and the server 20 then fails, then the client can re-establish a session with another server (e.g., server 25) which has a trust relationship with the server 20.

The client 15 and servers 20 and 25 include known components (e.g., processors and software) to permit the client to communicate with the server 20 and 25 and perform authentication and request/response operations, and to permit the servers 20 and 25 to establish a trust relationship 30.

In an embodiment of the invention, a method to provide client session failover includes the following steps. Step (100) involves the authentication of the client 15 to the server application (or server) 20. Authentication is required prior to the initial session establishment. As known to those skilled in the art, authentication is the process of identifying an individual (who is using the client 15). Authentication is usually based on a username and password, and merely insures that the individual is who he or she claims to be, but says nothing about the access rights of the individual. As also known to those skilled in the art, a session is a series of interactions between two communication end points that occur during the span of a single connection. Typically, one end point requests a connection with another specified end point and if that end point replies agreeing to the connection, the end points take turns exchanging commands and data ("talking to each other"). The session begins when the connection is established at both ends and terminates when the connection is ended.

In response to a successful authentication, the server application 20 returns both a local session token and a security assertion, as shown in step (200). The local session is typically the MD5 hash of a randomly generated number in which uniqueness can be insured. This token is then used by the server 20 as an index into its session manager on subsequent calls by the client.

The security assertion is typically based upon the Security Assertion Markup Language (SAML), which is an XML-based schema definitions and protocols for transmitting security information. SAML defines mechanisms to exchange authentication, authorization and attribute information, allowing single sign-on capabilities for Web applications and services.

Steps 300 and 400 depict the normal standard request/response model of the client/server application. The local session token is communicated to the server 20 in each request by the client 15 (step 300). The local session token acts as the session identifier for the client 15 and is used to maintain the session between a client and a server. As an example, in a web browser environment, the token is typically a cookie. The server 20 responds to requests made by the client 15 (step 400).

After a failure by the server 20, the client request will either time-out or fail (step 500), at which point the client 15 will then attempt to establish a session with another server by presenting its security assertion acquired in step (200). The client 15 will make a request to a failover server and the security assertion is included in the request (step 600). (The client 15 will typically be pre-configured with the location of fail-over server 25 that the request 600 is sent to. Additionally, there can be more than one fail-over server.) Since there is a failover situation, the client 15 is not sending a session token to a failover server. Instead, the client 15 is sending the security assertion in the request to the failover server. The security assertion permits the failover server 25 to detect that there is a failover situation and that the failover server 25 should attempt to establish a new local session with the particular client 15.

Failover server 25 will validate the security assertion and establish a new local session context based upon the security assertion contents (step 700). The failover server 25 will validate the security assertion by typically looking at the contents of the security assertion. The security assertions would minimally, verify the authenticated identity of the user by including such parameters as a name identifier, method of authentication, validity period, and signature of the user. A name identifier identifies the particular user of the client 15, and a user signature is the digital signature of the user of client 15. A method of authentication indicates how an authentication was made (e.g., by use of a user name and password, and/or the like). A validity period indicates how long that a security assertion is valid. A security assertion created by a server typically expires after a given time period (e.g., 2 hours, one day, or one week).

Additionally, the security assertions could contain session context information (e.g., shopping cart items) in the form of a serialized object or binary encoding. The security assertions would be obtained by the client 15 upon session establishment and then updated using either a push or pull mechanisms on time-based intervals or as the session information changes.

In step (800), the server 25 sends a response to the client 15, where the response includes a new local session token for use in future communications with that server 25. In addition, in step (800) the server 25 will include in the response to the client 15 a new security assertion 40 for use by the client 15 in the event a future fail-over situation.

In FIG. 1, although the client 15 is shown to failover to the server 25, the client may also fail to any other server that has a trust relationship 30 with the server 20.

As mentioned above, an embodiment of the invention relies on the pre-establishment of a trust relationship 30 between servers in the failover environment. In one example, this would amount to the sharing of keying information for digitally signing the assertions. The trust relationship 30 permits the failover server to consume a security assertion that was previously created by a server in the trust relationship 30.

Figure 2:
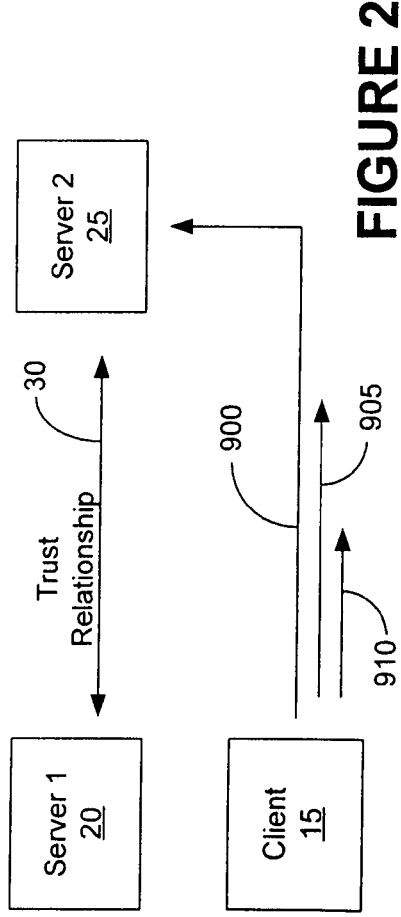
FIG. 2 is a block diagram illustrating a method to establish a trust relationship between servers.

Various known methods can be used to create the trust relationship 30. For example, FIG. 2 shows a method to establish a trust relationship 30 between servers 20 and 25 by use of out-of-band communication (i.e., requests from the client 15). The failover server 25 receives a client request 900 from the client 15 after the server 20 fails (see also step 600 in FIG. 1). The client request 900 will include a security assertion 905 which includes an Internet Protocol (IP) address 910 of server 20. The server 25 can recognize if the IP address 910 of server 20 is recognizable based upon a written agreement between server 20 and 25. Written agreements are typically used when the server 20 and 25 are hosted and owned by separate organizations. The written agreement amounts to a business contract between two or more entities that they will trust security assertions shared among them if they contain specific agreed to information (e.g., IP address or originating server, or shared secret key).

Figure 3:
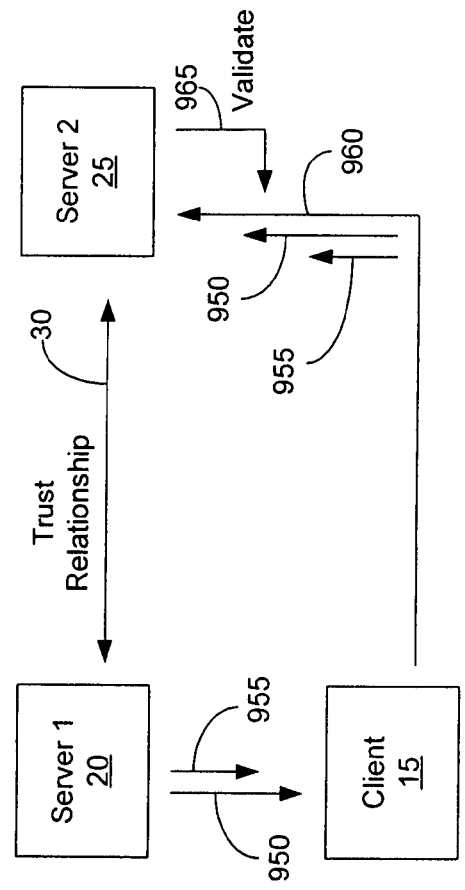
FIG. 3 is a block diagram illustrating another method to establish a trust relationship between servers.

FIG. 3 shows another method to establish a trust relationship 30 between servers 20 and 25 by use of PKI (public key infrastructure). As known to those skilled in the art, PKI enables users of a basically unsecured public network, such as the Internet, to securely and privately exchange data and money through the use of a public and a private cryptographic key pair that is obtained and shared through a trusted authority. The public key infrastructure provides for a digital certificate that can identify an individual or an organization and directory services that can store and, when necessary, revoke the certificates.

The server 20 can sign a security assertion 950 by use of a digital signature 955. The failover server 25 receives a client request 960 from the client 15 after the server 20 fails (see also step 600 in FIG. 1). The client request 960 will include the security assertion 950 and the digital signature 955 which can be validated (965) by the failover server 25.

Other suitable methods to establish a trust relationship 30 betweens servers may be used.

To avoid the increase in communication overhead, an embodiment of the invention employs a hybrid approach to sessioning by using traditional server-based session management techniques (e.g., HttpSession) during normal runtime operation, and then using the client stored security assertions when communicating with the new (failover) servers in the event of failover. The failover server (e.g., server 25) can ascertain the previous session information from the security assertion and create a new server-based session for the client.

Embodiments of the invention achieve various advantages. First, embodiments of the invention do not require database synchronization, or hardware clustering techniques on the servers. Second, because of the hybrid approach of embodiments of the invention, the communication channel (s) is not overloaded with session context information for every client request or server response. Third, in embodiments of the invention, security is based upon the trust relationship established between the failover servers, and thus the client does not need to deal with complex signature or encryption processing of the session information. Fourth, embodiments of the invention scale well both vertically and horizontally. A client can failover to any server that has a pre-established trust relationship with the server that issued the security assertion.

The various engines or modules discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method to provide client session failover, the method comprising:
   authenticating a client to a server;
   when the client is authenticated, sending a local session token and a security assertion from the server to the client, where the local session token is used to maintain a local session between the client and the server and where the security assertion is then stored in the client, and wherein the security assertion includes authentication information, authorization information, a validity period for the security assertion, and attribute information to permit the client to failover to a failover server;
   if the server fails, sending a request including the security assertion from the client to the failover server;
   validating, by the failover server, the security assertion, so that the failover server establishes a session with the client in response to a successful validation of the security assertion; and
   establishing a new local session between the client and the failover server after the failover server successfully validates the security assertion so that the security assertion that is successfully validated permits the client to failover from the server to the failover server.

2. The method of claim 1, further comprising:
establishing a trust relationship between the server that issues the security assertion and the failover server.

3. The method of claim 2, wherein the trust relationship is established by one of the following steps:
sending a request from the server to the failover server after the server has failed, where the request includes an address of the server; or
using a public key infrastructure to establish the trust relationship.

4. The method of claim 1, wherein the client performs failover to the failover server in response to a failure of the server that issues the security assertion.

5. The method of claim 1, further comprising:
validating the security assertion before establishing the new local session with the client to permit the client to failover to the failover server.

6. The method of claim 1, wherein the security assertion permits the failover server to detect that a failover situation and that the failover server should establish the new local session with the client.

7. The method of claim 1, wherein the authentication information in the security assertion comprises a name identifier identifying a user of the client, a digital signature of the user, an authentication method between the client and the server, and a validity period of the security assertion.

8. The method of claim 1, further comprising:
sending a new local session token and a new security assertion from the failover server to the client, where the new local session token is used to maintain the new local session between the client and the failover server and where the new security assertion permits exchange of authentication information, authorization information, and attribute information to permit the client to failover to another failover server.

9. An apparatus to provide client session failover, the apparatus comprising:
a client;
a server configured to provide a local session token and a security assertion to the client, where the client is authenticated to the server, where the local session token is used to maintain a local session between the client and the server and where the security assertion includes authentication information, authorization information, a validity period for the security assertion, and attribute information to permit the client to failover to a failover server; and
if the server fails, then the client sends a request including the security assertion to the failover server, and where the failover server validates the security assertion, so that the failover server establishes a session with the client in response to a successful validation of the security assertion and where a new local session is established between the client and the failover server after the failover server successfully validates the security assertion.

10. The apparatus of claim 9, wherein the server and the failover server have a trust relationship.

11. The apparatus of claim 10, wherein the trust relationship is established by one of the following steps:
sending a request from the server to the failover server after the server has failed, where the request includes an address of the server; or
using a public key infrastructure to establish the trust relationship.

12. The apparatus of claim 9, wherein the client performs failover to the failover server in response to a failure of the server that issues the security assertion.

13. The apparatus of claim 9, wherein the failover server validates the security assertion before establishing the new local session with the client to permit the client to failover to the failover server.

14. The apparatus of claim 9, wherein the security assertion permits the failover server to detect that a failover situation and that the failover server should establish the new local session with the client.

15. The apparatus of claim 9, wherein the authentication information in the security assertion comprises a name identifier identifying a user of the client, a digital signature of the user, an authentication method between the client and the server, and a validity period of the security assertion.

16. The apparatus of claim 9, wherein the failover server sends to the client a new local session token and a new security assertion, where the new local session token is used to maintain the new local session between the client and the failover server and where the new security assertion permits exchange of authentication information, authorization information, and attribute information to permit the client to failover to another failover server.

17. A method to permit a failover server to re-establish a client session, the method comprising:
issuing, by a server, a local session token and a security assertion to a client and establishing a session with client based on the local session token;
where the security assertion is stored in the client and the security assertion includes authentication information, authorization information, a validity period for the security assertion, and attribute information to permit the client to failover to a failover server;
if the server fails, sending a request including the security assertion from the client to the failover server; and
validating, by the failover server, the security assertion so that the failover server establishes a session with the client and the client can failover from the server to the failover server, in response to a successful validation of the security assertion.

18. The method of claim 17, wherein the security assertion permits the failover server to detect that a failover situation and that the failover server should establish the new local session with the client.

19. The method of claim 17, wherein the authentication information in the security assertion comprises a name identifier identifying a user of the client, a digital signature of the user, an authentication method between the client and the server, and a validity period of the security assertion.

20. The method of claim 17, further comprising:
sending a new local session token and a new security assertion from the failover server to the client, where the new local session token is used to maintain the new local session between the client and the failover server and where the new security assertion permits exchange of authentication information, authorization information, and attribute information to permit the client to failover to another failover server.

21. A method to permit a client to failover to another server, the method comprising:
receiving, by a client, a local session token and a security assertion from a server and establishing a local session with the server and the client based on the local session token;
where the security assertion is stored in the client and where the security assertion includes authentication information, a validity period for the security assertion, authorization information, and attribute information to permit the client to failover to the another server;

in response to a failure by the server, sending a request including the security assertion from the client to the server to establish a new local session between the client and the another server if the another server validates the security assertion; and validating, by the another server, the security assertion, so that the another server establishes the new local session with the client in response to a successful validation of the security assertion.

22. The method of claim 14, wherein the security assertion permits the another server to detect that a failover situation and that the another server should establish the new local session with the client.

23. The method of claim 14, wherein the authentication information in the security assertion comprises a name identifier identifying a user of the client, a digital signature of the user, an authentication method between the client and the server, and a validity period of the security assertion.

24. The method of claim 14, further comprising:

sending a new local session token and a new security assertion from the another server to the client, where the new local session token is used to maintain the new local session between the client and the another server and where the new security assertion permits exchange of authentication information, authorization information, and attribute information to permit the client to failover to a third server.

25. An apparatus to provide client session failover, the apparatus comprising:

means for authenticating a client to a server;

means for sending a local session token and a security assertion from the server to the client when the client is authenticated, where the local session token is used to maintain a local session between the client and the server and where the security assertion is then stored in the client and where the security assertion includes authentication information, authorization information, a validity period for the security assertion, and attribute information to permit the client to failover to a failover server;

means for sending a request including the security assertion from the client to the failover server if the server fails;

means for validating, by the failover server, the security assertion, so that the failover server establishes a session with the client in response to a successful validation of the security assertion; and means for establishing a new local session between the client and the failover server after the failover server successfully validates the security assertion so that the security assertion that is successfully validated permits the client to failover from the server to the failover server.

26. The apparatus of claim 25, wherein the security assertion permits the failover server to detect that a failover situation and that the failover server should establish the new local session with the client.

27. The apparatus of claim 25, wherein the authentication information in the security assertion comprises a name identifier identifying a user of the client, a digital signature of the user, an authentication method between the client and the server, and a validity period of the security assertion.

28. The apparatus of claim 25, further comprising:

means for sending a new local session token and a new security assertion from the failover server to the client, where the new local session token is used to maintain the new local session between the client and the failover server and where the new security assertion permits exchange of authentication information, authorization information, and attribute information to permit the client to failover to another failover server.

29. An article of manufacture, comprising:

a machine-readable medium having stored thereon instructions wherein the instructions are executed by a machine for performing the step of:

authenticating a client to a server;

when the client is authenticated, sending a local session token and a security assertion from the server to the client, where the local session token is used to maintain a local session between the client and the server and where the security assertion is then stored in the client and where the security assertion includes authentication information, authorization information, a validity period for the security assertion, and attribute information to permit the client to failover to a failover server;

if the server fails, sending a request including the security assertion from the client to the failover server;

validating, by the failover server, the security assertion, so that the failover server establishes a session with the client in response to a successful validation of the security assertion; and establishing a new local session between the client and the failover server after the failover server successfully validates the security assertion so that the security assertion that is successfully validated permits the client to failover from the server to the failover server.

30. The article of manufacture of claim 29, wherein the security assertion permits the failover server to detect that a failover situation and that the failover server should establish the new local session with the client.

31. The article of manufacture of claim 29, wherein the authentication information in the security assertion comprises a name identifier identifying a user of the client, a digital signature of the user, an authentication method between the client and the server, and a validity period of the security assertion.

32. The article of manufacture of claim 29, wherein the instructions are executed by a machine for performing the additional step of:

sending a new local session token and a new security assertion from the failover server to the client, where the new local session token is used to maintain the new local session between the client and the failover server and where the new security assertion permits exchange of authentication information, authorization information, and attribute information to permit the client to failover to another failover server.

* * * * *

UNITED STATES PATENT AND TRADEMARK OFFICE
CERTIFICATE OF CORRECTION

| | | |
|---|---|---|
| PATENT NO. | : 7,308,502 B2 | Page 1 of 1 |
| APPLICATION NO. | : 10/326774 | |
| DATED | : December 11, 2007 | |
| INVENTOR(S) | : Jason Rouault | |

It is certified that error appears in the above-identified patent and that said Letters Patent is hereby corrected as shown below:

In column 9, line 13, in Claim 22, after "claim" delete "14" and insert -- 21 --, therefor.

In column 9, line 17, in Claim 23, after "claim" delete "14" and insert -- 21 --, therefor.

In column 9, line 22, in Claim 24, after "claim" delete "14" and insert -- 21 --, therefor.

Signed and Sealed this

Twenty-seventh Day of May, 2008

JON W. DUDAS
*Director of the United States Patent and Trademark Office*